June 5, 1962     D. P. STRINGER     3,037,216
CARRIER

Filed Feb. 12, 1960     2 Sheets-Sheet 1

INVENTOR.
DAVID P. STRINGER
BY Woodling & Kwast
ATTORNEYS

June 5, 1962  D. P. STRINGER  3,037,216
CARRIER

Filed Feb. 12, 1960

INVENTOR.
DAVID P. STRINGER
BY Woodling & Krost
ATTORNEYS

United States Patent Office 3,037,216
Patented June 5, 1962

3,037,216
CARRIER
David P. Stringer, 4119 Spokane Ave., Cleveland, Ohio
Filed Feb. 12, 1960, Ser. No. 8,292
2 Claims. (Cl. 5—118)

The present invention relates in general to carriers or racks and more specifically to such carriers as may be utilized in motor vehicles.

An object of the invention is to provide a carrier for holding an infant in a motor vehicle.

Another object of the invention is to provide a carrier which is attached to the top of the front seat of a motor vehicle at one end portion thereof and has the other end portion thereof resting and not secured to the top of the back seat of the motor vehicle. This enables the carrier to be used in motor vehicles having different distances between the front and back seats without the necessity of having to adjust the carrier in any manner.

Another object of the invention is to provide a carrier which may be quickly and conveniently assembled and disassembled.

Another object of the invention is to provide a carrier which includes disconnectable tubular members held in assembled position at least in part by the fabric or cloth of the carrier.

Another object of the invention is to provide a carrier which includes first and second side members bent at one end into a U-shape to fit over the back of the front seat of a motor vehicle and connected at the other end by a disconnectable connecting member and with the side members and connecting member held in place by the fabric of the carrier in combination with a securing member fastened to the side members.

Another object of the invention is to provide a carrier for holding clothes or other items in a motor vehicle.

Another object of the invention is to provide a carrier with strap means for holding a child thereon or for holding other items carried thereby.

Other objects and a fuller understanding of this invention may be had by referring to the following description and claims, taken in conjunction with the accompanying drawings, in which:

Figure 1:
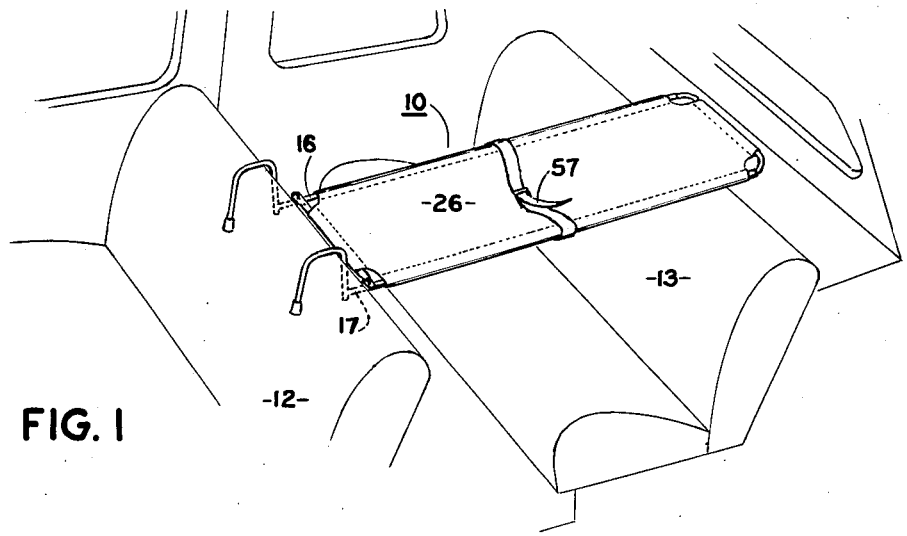
FIGURE 1 is a perspective view of the present invention in a motor vehicle.

The carrier of the present invention has been indicated generally by the reference numeral 10 and is adapted to hold a child thereon. The carrier as shown in FIGURE 1, extends between the front and back seats 12 and 13 respectively, of a motor vehicle such as the present day automobile. The carrier includes in combination first and second tubular side rails 16 and 17 respectively, each of which has first and second end portions 20 and 21, respectively. As will be noted, the first end portions 20 of each of the first and second tubular side rails 16 and 17 are formed into generally a U-shape 24 which fits over the back of the front seat 12 of the motor vehicle (FIGURE 1) to fixedly hold and secure the first and second tubular side rails in position. A rectangular piece of fabric or cloth 26 is provided and may be of a natural or synthetic material or a combination of both and is also preferably porous in nature. The fabric 26 has first, second, third, and fourth side portions 28, 29, 30, and 31, respectively. These side portions are folded back upon themselves and sewn by thread 34 in this folded back position to form first, second, third, and fourth longitudinally extending loop portions. The first and second tubular side rails 16 and 17 between the first and second end portions thereof respectively are extended through the first and second longitudinally extending loop portions 28 and 29 and in this manner, the first and second side portions of the fabric 26 are attached to the carrier.

Figure 2:
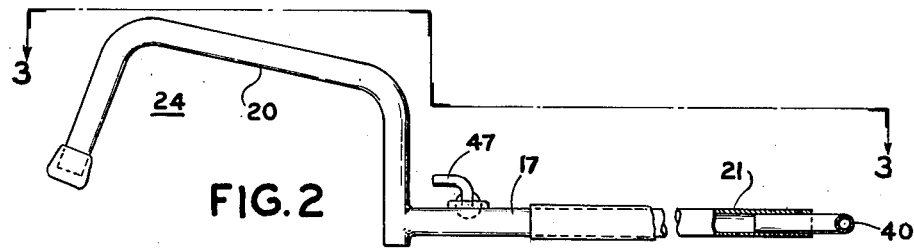
FIGURE 2 is an enlarged side elevational view of the carrier partially in section.
Figure 3:
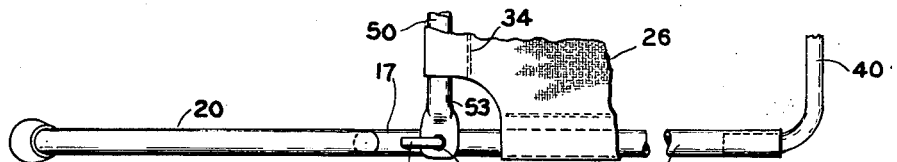
FIGURE 3 is a view taken generally along the line 3—3 of FIGURE 2.

An end connecting member 40 is provided and extends through the third longitudinally extending loop portion 30. This end connecting member has first and second curved end portions 41 and 42 respectively, which slidingly or telescopically fit into the second open end portion of the first and second tubular side rails respectively. This is best shown in FIGURES 2 and 3 of the drawings. As shown best in FIGURE 1, the second end portions 21 of the first and second tubular side rails are adapted to rest only on the back of the back seat 13 and this compensates for varying distances between the front and back seat of different motor vehicles. In other words, the second end portion is not fixedly or rigidly secured to the back seat and if the distance between the back and front seats happens to be short, this means only that the second end portion will extend closer to the rear window.

Figure 4:
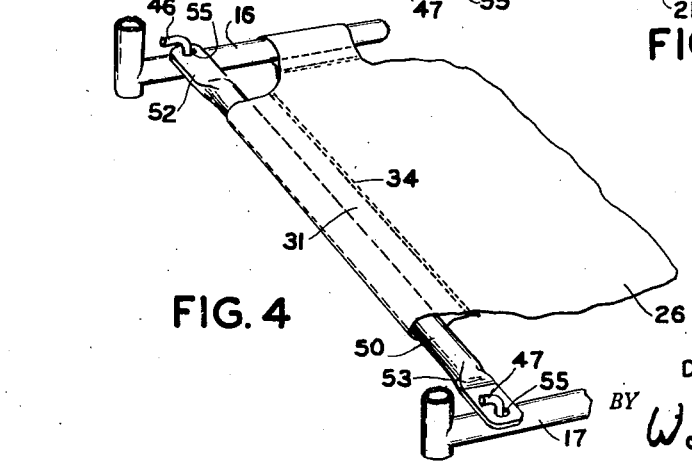
FIGURE 4 is a perspective view of the details of construction of the forward end of the carrier.
Figure 5:
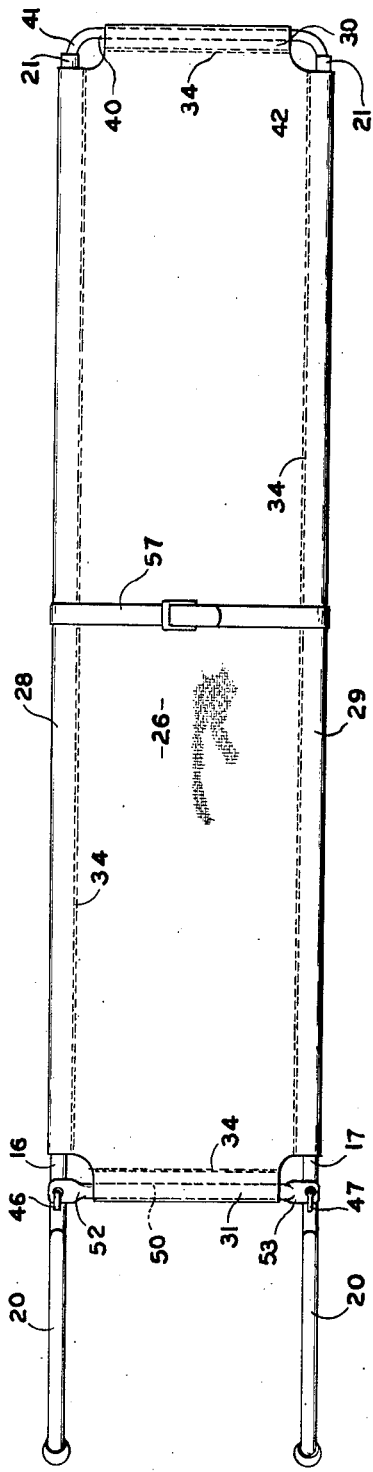
FIGURE 5 is a plan view of the carrier.
Figure 6:
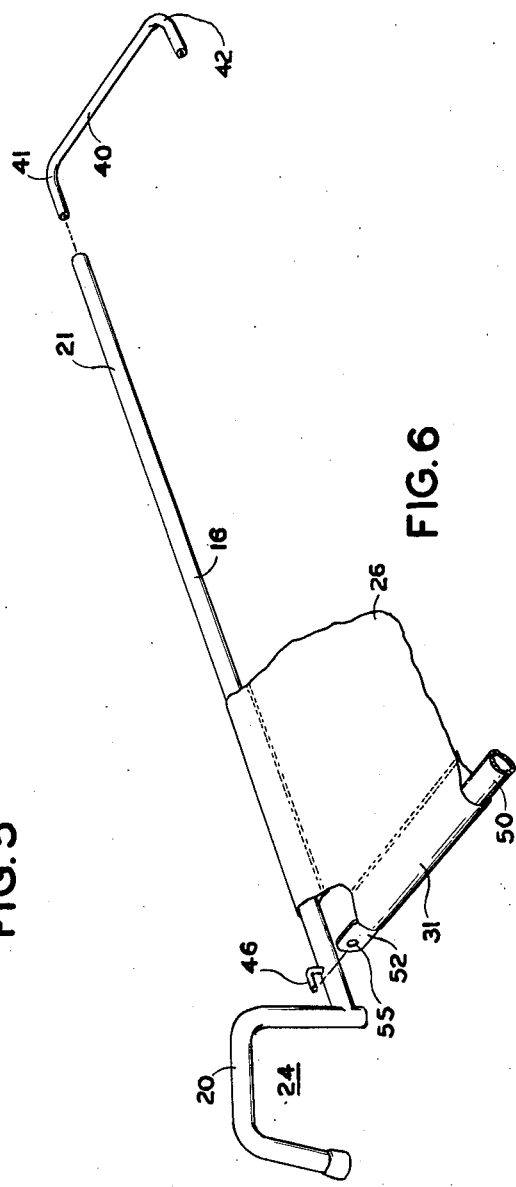
FIGURE 6 is another perspective view of the carrier of the present invention showing further constructional details before the carrier is completely assembled.

First and second holding pin members 46 and 47 are secured to the first and second tubular side rails 16 and 17 respectively, at a position adjacent the first and second U-shaped first end portions. These pin members, as will be noted from FIGURES 2, 3, and 4, extend generally vertically from the tubular side rails and then are bent at substantially right angles toward the U-shaped first end portions. A securing member 50 extends through the fourth longitudinally extending loop portion and is provided with first and second end portions 52 and 53, respectively. Wall means 55 define openings in the first and second end portions of said securing member 50. The securing member is held in position by extending the first and second holding pin members through the openings in the securing member. Strap means 57 are secured to the first and second tubular side rails 16 and 17 substantially intermediate their end portions and are for the purpose of holding a child on the carrier. The carrier may additionally be utilized for other purposes than carrying a child, for example, if it is desired to take a trip it is possible to carry clothing or other items in position on the carrier whereby ready access may be had to the same.

To assemble the carrier of the present invention the first and second tubular side rails 16 and 17 in their disassembled condition are inserted respectfully through the first and second longitudinally extending loop portions. After this has been done, the end connecting member is inserted through the third longitudinally extending loop portion and then the first and second curved ends 41 and 42 are respectively inserted into the second open end of the first and second tubular side rails. After this has been done, the securing member 50 is inserted through the fourth longitudinally extending loop portion and the securing member is pulled generally forwardly toward the U-shaped ends of the tubular side rails in order to enable one to register the openings in the securing member with the holding pin members. After the pin members have been inserted through the openings, the carrier is in its assembled condition. It will thus be seen that when assembled, the general tautness of the fabric maintains the carrier from becoming disassembled. The U-shaped first end portions of the carrier are then fixed over the back of the front seat as shown in FIGURE 1 and the second end portion is laid on top of the back of the back seat.

It will thus be seen that a carrier has been provided for holding and carrying an infant in a motor vehicle which enables an infant carried thereon to see from the motor vehicle while lying down on the carrier. This stems from the fact that when the carrier is assembled in the motor vehicle, the back is at a slightly elevated condition as compared to the front because this is the normal condition of the top of the back seat. It will also be seen that with the use of the carrier of the present invention that the varying distances between the front and back seats of automobiles is compensated for without the necessity of having to adjust or otherwise manipulate the carrier. The carrier may also be quickly and conveniently assembled and disassembled whenever it is desired to use or store the carrier. The carrier, as pointed out hereinabove, may also be conveniently used for carrying other articles, for example, clothing thereon which render the items carried by the same, readily available to the user. The use of the strap means in the carrier enables anyone or thing carried thereby to be maintained from falling therefrom.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A carrier for holding a child and adapted to extend between the front and back seats of a motor vehicle, including in combination first and second tubular side rails each having first and second end portions, said first end portion of each said first and second tubular side rails being formed into generally a U-shape and adapted to fit over the back of the front seat of the motor vehicle to fixedly hold said first and second side rails in position, a piece of fabric having first, second, third, and fourth sides, said sides of said fabric being folded back upon themselves and sewn in this position to form first, second, third, and fourth longitudinally extending loop portions, said first and second tubular side rails between said first and second end portions thereof respectively extending through said first and second longitudinally extending loop portions, an end connecting member extending through said third longitudinally extending loop portion, said end connecting member having first and second curved end portions slidingly fitting in the second end portions of said first and second tubular side rails, said second end portions of said first and second tubular side rails adapted to rest only on the back of the back seat to compensate for varying distances between the front and back seat of different motor vehicles, first and second pin members secured to said first and second tubular side rails respectively at a position adjacent said first and second U-shaped first end portions, each said pin member extending substantially vertically from its respective tubular side rail and having an upper end portion extending forwardly toward a U-shaped end portion, a securing member extending through said fourth longitudinally extending loop portion and having first and second end portions, wall means defining openings in said first and second end portions of said securing member, said securing member being held in position by extending said first and second pin members through said openings in said first and second end portions of said securing member respectively, and strap means secured to said first and second tubular side rails for holding a child on said carrier.

2. A carrier, including in combination first and second tubular side rails each having first and second end portions, said first end portion of each said first and second tubular side rail being formed into generally a U-shape, a piece of fabric having first, second, third, and fourth sides, said sides of said fabric having first, second, third and fourth longitudinally extending loop portions, said first and second tubular side rails between said first and second end portions thereof respectively extend through said first and second longitudinally extending loop portions, an end connecting member extending through said third longitudinally extending loop portion, said end connecting member having first and second curved end portions slidingly fitting in the second end portions of said first and second tubular side rails, first and second pins secured to said first and second tubular side rails respectively at a position adjacent said first and second U-shaped first end portions, each said pin extending substantially vertically from its respective tubular side rail and having an upper end portion extending forwardly toward a U-shaped end portion, a securing member extending through said fourth longitudinally extending loop portion and having first and second end portions, wall means defining openings in said first and second end portions of said securing member, and said securing member being held in position by extending said first and second pins through said openings in said first and second end portions of said securing member respectively.

References Cited in the file of this patent

UNITED STATES PATENTS

| | | |
|---|---|---|
| 1,204,416 | Doser | Nov. 14, 1916 |
| 1,732,520 | Leatherman | Oct. 22, 1929 |
| 1,950,709 | Wells | Mar. 13, 1934 |
| 2,260,584 | Schuck et al. | Oct. 28, 1941 |
| 2,645,540 | Trimble et al. | July 14, 1953 |
| 2,670,478 | Gilfillan | Mar. 2, 1954 |
| 2,790,184 | Testa | Apr. 30, 1957 |
| 2,825,911 | Townsley | Mar. 11, 1958 |
| 2,902,286 | Wood | Sept. 1, 1959 |